(12) United States Patent
Ladouce et al.

(10) Patent No.: US 6,703,497 B1
(45) Date of Patent: Mar. 9, 2004

(54) CELLULOSE MICROFIBRILS WITH MODIFIED SURFACE, PREPARATION METHOD AND USE THEREOF

(75) Inventors: Laurence Ladouce, Paris (FR); Etienne Fleury, Irigny (FR); Cécile Gousse, Meylan (FR); Robert Cantiani, Lyons (FR); Henri Chanzy, La Tronche (FR); Gérard Excoffier, Vaulnaveys-le-Haut (FR)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 09/787,272
(22) PCT Filed: Sep. 9, 1999
(86) PCT No.: PCT/FR99/02148
§ 371 (c)(1), (2), (4) Date: Jun. 25, 2001
(87) PCT Pub. No.: WO00/15667
PCT Pub. Date: Mar. 23, 2000

(30) Foreign Application Priority Data

Sep. 15, 1998 (FR) .............................. 98 11507

(51) Int. Cl.$^7$ .......................... C08B 11/00; C08B 15/00
(52) U.S. Cl. ............... 536/56; 536/84; 536/95; 536/96; 536/124
(58) Field of Search ............... 536/56, 84, 95, 536/96, 124

(56) References Cited

U.S. PATENT DOCUMENTS 6,103,790 A * 8/2000 Cavaille et al.

* cited by examiner

Primary Examiner—Samuel Barts
Assistant Examiner—Michael C. Henry

(57) ABSTRACT

The invention concerns cellulose microfibrils with modified surface, characterised in that the hydroxyl functions present at the surface of the microfibrils are etherified with at least an organic compound comprising at least a function capable of reacting with said hydroxyl functions, and the degree of surface substitution (DSs) is at least 0.05. The invention also concerns a method for obtaining said microfibrils and their use as agent for modifying viscosity, texture and/or as reinforcing filler.

18 Claims, No Drawings

CELLULOSE MICROFIBRILS WITH MODIFIED SURFACE, PREPARATION METHOD AND USE THEREOF

This application is an application under 35 U.S.C. Section 371 of International Application Number PCT/FR99/02148 filed on Sep. 9, 1999.

A subject-matter of the present invention is cellulose microfibrils with a modified surface, their process of preparation and their use.

Another subject-matter of the invention is compositions comprising cellulose microfibrils with a modified surface.

Generally, native cellulose is a chain of D-anhydroglucopyranose units bonded to one another at the β-1,4 positions. The degree of polymerization (DP) of the said chain can vary from a few hundred to several thousand monomer units, depending upon the source used. In the native state, intermolecular hydrogen bonds promote a parallel association of the cellulose chains with one another to form microfibrils with more or less crystalline structures, the diameter of which can vary from 10 Å to 500 Å.

These microfibrils are well known materials which have already been proposed, in general, for modifying the rheology of the media into which they are introduced.

In the case of fluid aqueous or organic media of the type of those intended for the production in particular of cosmetic compositions, of drilling fluids, and the like, the microfibrils can modify the viscosity and/or the texture of the medium, indeed even its rheological profile.

In highly viscous and solid media of the type of those intended to be employed in thermoplastics, thermosetting materials, elastomers and mastics, the microfibrils can modify the mechanical properties and can act in particular as reinforcing filler.

The advantageous mechanical properties of microfibrils are attributed to their specific structure; they have a highly hydrophilic nature due to the presence of hydroxyl functional groups at the surface of the microfibril.

However, the use of these microfibrils is not without disadvantage.

This is because the hydrophilic nature, which may be desirable in some applications, for example in aqueous and/or hydrophilic media, can constitute an obstacle to various applications desired in organic and/or hydrophobic media.

For example, in an organic and/or hydrophobic medium, the microfibrils do not disperse and phenomena of agglomeration and of flocculation occur, these phenomena being due to the incompatibility of the microfibrils with the organic medium in which they are found; as the microfibrils have a strongly hydrophilic nature, they will naturally have a tendency to flocculate and to agglomerate in an organic medium with a hydrophobic nature.

As a result of these phenomena, more particularly in an organic medium, the microfibrils will no longer be in a position to exercise their role of texturizing or viscosifying agent and/or of reinforcing filler.

An aim of the present invention is to provide cellulose microfibrils which, while having retained their initial morphological and crystalline aspects and thus all the advantageous mechanical properties which result therefrom, exhibit a markedly weakened hydrophilic nature.

Another aim of the invention is to provide microfibrils which can be dispersed in an organic medium.

These aims are achieved by the present invention, the subject matter of which is cellulose microfibrils with a modified surface, characterized in that the hydroxyl functional groups present at the surface of the microfibrils are etherified by at least one organic compound comprising at least one functional group which can react with the said hydroxyl functional groups and in that the degree of surface substitution (DSS) is at least 0.05.

The organic residues originating from the etherifying organic compounds attached at the surface of the microfibrils provide for better compatibility of the microfibril with the organic medium in which it is dispersed. The hydrophilic nature of the microfibrils is consequently markedly weakened and they can thus control the rheological properties of the medium.

At this stage, it is important to define the term "dispersibility".

In the context of the present invention, the term "dispersibility" denotes the surface-modified microfibrils which, once introduced into an organic medium, are capable of dispersing with a gentle shearing and of forming a non-flocculating dispersion.

In other words, the microfibrils of the invention are rendered dispersible by a surface hydrophobicization of the hydroxyl functional groups: their initial morphology is retained and a crystalline arrangement is still observed.

Within the meaning of the invention, the term "organic medium" denotes a medium composed of an inert organic and/or hydrophobic liquid or of a mixture of inert organic and/or hydrophobic liquids in which the "unmodified" microfibrils do not disperse. When it is a mixture of liquids, they will preferably be miscible. Mention may be made, by way of indication, of:

alcohols, such as ethanol, isopropanol, butanol, hexanol or octanol;

aldehydes and ketones, such as butyraldehyde, acetone, methyl ethyl ketone or 4-methyl-2-pentanone;

cyclic or acyclic ethers, such as diethyl ether and its higher homologues, dioxane or tetrahydrofuran;

halogenated solvents, such as dichloro-, dibromo- or diiodomethane, chloroform, bromoform or carbon tetrachloride;

cyclic or acyclic alkanes, such as pentane, hexane, octane, dodecane, cyclopentane or cyclohexane;

optionally substituted aromatic solvents, such as benzene, toluene, chlorobenzene, bromobenzene;

alkyl acetates, such as methyl acetate, ethyl acetate, propyl acetate, butyl acetate or pentyl acetate;

fatty acid esters, such as isopropyl myristate or the methyl esters of palmitic acid, stearic acid, arachidic acid, soybean oil fatty acid, rapeseed oil fatty acid, maize oil fatty acid, sunflower oil fatty acid or groundnut oil fatty acid.

The cellulose microfibrils can be of any origin, for example of plant, bacterial, animal, fungal or amoebic origin, preferably plant, bacterial or animal origin.

Mention may be made, as an example of animal sources of cellulose, of animals of the Tunicata.

The plant sources of cellulose can be wood, cotton, flax, ramie, certain algae, jute, sugarbeet pulp or citrus fruits (lemon, orange or grapefruit) or the like.

Whatever the origin of the microfibrils, they advantageously exhibit an L/D ratio of greater than 15, advantageously of greater than 50, more particularly of greater than 100 and preferably of greater than 500 and a mean diameter (D) of between 10 Å and 500 Å, advantageously between 15 Å and 200 Å, more particularly between 15 Å and 70 Å, preferably between 18 Å and 40 Å, L representing the length of the microfibrils and D their mean diameter.

The microfibrils can be obtained from the abovementioned cellulose sources by various processes already described in the literature. Reference may be made, among these processes, for example to the processes disclosed in European Patent Applications EP 0 726 356 and EP 0 102 829 or U.S. Pat. No. 4,481,076, the teachings of which on this subject are incorporated here.

According to a particularly advantageous embodiment of the present invention, the microfibrils are obtained by employing the process which will be described below.

More particularly, this process is carried out on pulp from plants with primary walls, such as, for example, beet pulp after the latter has been subjected to a stage of preliminary extraction of the sucrose, according to methods known in the art.

Thus, the process comprises the following stages:
(a) first acidic or basic extraction, on conclusion of which a first solid residue is recovered,
(b) optionally, second extraction, carried out under alkaline conditions, of the first solid residue, following which a second solid residue is recovered,
(c) washing of the first or second solid residue,
(d) optionally, bleaching of the washed residue,
(e) dilution of the first solid residue obtained on conclusion of stage (d), so as to obtain a solids content of between 2 and 10% by weight,
(f) homogenization of the dilute suspension.

In stage (a), the term "pulp" is understood to mean wet, dehydrated pulp preserved by ensiling or partially depectinized.

The extraction stage (a) can be carried out in an acidic medium or in a basic medium.

For an acidic extraction, the pulp is suspended in an aqueous solution for a few minutes, so as to homogenize the acidified suspension at a pH of between 1 and 3, preferably between 1.5 and 2.5.

This operation is carried out with a concentrated solution of an acid, such as hydrochloric acid or sulphuric acid.

This stage can be advantageous in removing calcium oxalate crystals which may be present in the pulp and which, because of their highly abrasive nature, can result in difficulties in the homogenization stage.

For a basic extraction, the pulp is added to an alkaline solution of a base, for example sodium hydroxide or potassium hydroxide, with a concentration of less than 9% by weight, more particularly of less than 6% by weight. The concentration of the base is preferably between 1 and 2% by weight.

The small amount of a water-soluble antioxidizing agent, such as sodium sulphite $Na_2SO_3$, can be added in order to limit the oxidation reactions of the cellulose.

Stage (a) is generally carried out at a temperature of between approximately 60° C. and 100° C., preferably of between approximately 70° C. and 95° C.

The duration of stage (a) is between approximately 1 hour and approximately 4 hours.

During stage (a), partial hydrolysis takes place with release and solubilization of most of the pectins and hemicelluloses, while retaining the molecular mass of the cellulose.

The solid residue is recovered from the suspension originating from stage (a) by employing known methods. Thus, it is possible to separate the solid residue by centrifugation, by filtration under vacuum or under pressure, with filter cloths, or filter presses, for example, or by evaporation.

The first solid residue obtained is optionally subjected to a second extraction stage carried out under alkaline conditions.

A second extraction stage, stage (b), is carried out when the first has been carried out under acidic conditions. If the first extraction was carried out under alkaline conditions, the second stage is only optional.

According to the process, this second extraction is carried out with a base preferably chosen from sodium hydroxide and potassium hydroxide, the concentration of which is less than approximately 9% by weight, preferably of between approximately 1% and approximately 6% by weight.

The duration of the alkaline extraction stage is between approximately 1 and approximately 4 hours. It is preferably equal to approximately 2 hours.

On conclusion of this second extraction, if it takes place, a second solid residue is recovered.

In stage (c), the residue originating from stage (a) or (b) is copiously washed with water in order to recover the cellulose material residue.

The cellulose material from stage (c) is then optionally bleached, in stage (d), according to conventional methods. For example, a treatment with sodium chlorite, with sodium hypochlorite or with hydrogen peroxide in a proportion of 5–20% with respect to the amount of solids treated can be carried out.

Various concentrations of bleaching agent can be used, at temperatures of between approximately 18° C. and 80° C., preferably between approximately 50° C. and 70° C.

The duration of this stage (d) is between approximately 1 hour and approximately 4 hours, preferably between approximately 1 and approximately 2 hours.

A cellulose material comprising between 85 and 95% by weight of cellulose is then obtained.

On conclusion of this bleaching stage, it may be preferable to copiously wash the cellulose with water.

The resulting suspension, optionally bleached, is subsequently rediluted in water in a proportion of 2 to 10% of solids (stage (e)), before being subjected to a homogenization stage (stage (f)) comprising at least one cycle.

The homogenization stage corresponds to a mixing or milling operation or any operation of high mechanical shear, followed by one or more passes of the suspension of cells through an orifice with a small diameter, subjecting the suspension to a drop in pressure of at least 20 mPa and to a high-speed shear action, followed by a high-speed deceleration impact.

The mixing or milling is carried out, for example, by pass(es) through the mixer or mill for a period of time ranging from a few minutes to approximately one hour in a standard device, such as a Waring Blender equipped with a four-blade propeller, or edge runner mill or any other type of mill, such as a colloid mill.

The homogenization proper will advantageously be carried out in a homogenizer of the Manton Gaulin type in which the suspension is subjected to a shear action at high speed and high pressure in a narrow passage and against an impact ring.

Mention may also be made of the Micro Fluidizer, which is a homogenizer mainly composed of a compressed-air motor which will create very high pressures, of an interaction chamber, in which the homogenization operation (elongational shear, impacts and cavitations) will take place, and of a low-pressure chamber which allows the dispersion to be depressurized.

The suspension is introduced into the homogenizer, preferably after preheating to a temperature of between 40 and 120° C., preferably of between 85 and 95° C.

The temperature of the homogenization operation is maintained between 95 and 120° C., preferably above 100° C.

The suspension is subjected, in the homogenizer, to pressures of between 20 and 100 mPa and preferably of greater than 50 mPa.

The homogenization of the cellulose suspension is obtained by a number of passes which can vary between 1 and 20, preferably between 2 and 5, until a stable suspension is obtained.

The homogenization operation can advantageously be followed by an operation of high mechanical shear, for example in a device such as the Ultra Turrax from Silverson.

Once obtained, the microfibrils will be subjected to an etherification reaction.

In the context of the present invention, the term "etherification" is employed in the broad sense and denotes reactions in which hydroxyl functional groups O—H can be converted into O—Y, in particular:

silylation reactions (Y=—$SiR_1R_2R_3$), etherification reactions (Y=—$R_4$), condensations with isocyanates (Y=—CO—NH—$R_5$), condensations or substitutions with alkylene oxides (Y=$CH_2$—CH($R_6$)—OH), condensations or substitutions with glycidyl compounds (Y=—$CH_2$—CH(OH)—$CH_2$—$R_7$).

The organic compound comprising at least one functional group which can react with the hydroxyl functional groups which are found at the surface of the microfibrils will also be referred to, in the continuation of the account, as etherifying organic compound or etherification agent.

The etherification agent is advantageously chosen from silylating agents, isocyanates, halogenated alkylating agents, alkylene oxides and/or glycidyl compounds.

The silylating agents can be chosen from:

haloalkylsilanes of formula: $R_3R_2R_1Si$—X, $R_2R_1Si(X)_2$ or $R_1Si(X)_3$;

disilazanes of formula: $R_3R_2R_1N$—Si—$NR_1R_2R_3$;

N-silylacetamides of formula: $CH_3$—CO—NH—$SiR_1R_2R_3$; and alkoxysilanes of formula: $R_3R_2R_1Si$—OR or $R_2R_1Si(OR)(OR_3)$;

in which

R, $R_1$, $R_2$ and $R_3$, which are identical or different, can be chosen from optionally substituted, saturated or unsaturated, linear, branched or cyclic hydrocarbonaceous radicals comprising from 1 to 30 carbon atoms, and X is a halogen atom chosen from chlorine, bromine or iodine.

The R, $R_1$, $R_2$ and $R_3$ radicals can be chosen from methyl, ethyl, propyl, isopropyl, butyl, sec-butyl, tert-butyl, pentenyl, hexyl, cyclohexyl, octyl, nonyl, decyl, dodecyl, undecyl, nonadecyl, eicosyl ($C_{20}$), docosyl ($C_{22}$), octacosyl ($C_{28}$), triacontanyl ($C_{30}$), vinyl, allyl, phenyl, styryl or naphthyl.

Mention may more particularly be made, as silylating agent, of:

among haloalkylsilanes: chlorodimethylisopropylsilane, chlorodimethylbutylsilane, chlorodimethyloctylsilane, chlorodimethyldodecylsilane, chlorodimethyloctadecylsilane, chlorodimethylphenylsilane, chloro-(1-hexenyl) dimethylsilane, dichlorohexylmethylsilane, dichloroheptylmethylsilane or trichlorooctylsilane;

among disilazanes: hexamethyldisilazane, 1,3-divinyl-1,1,3,3-tetramethyldisilazane, 1,3-divinyl-1,3-diphenyl-1,3-dimethyldisilazane, 1,3-N-dioctyltetramethyldisilazane, diisobutyltetramethyldisilazane, diethyltetramethyldisilazane, N-dipropyltetramethyldisilazane, N-dibutyltetramethyldisilazane or 1,3-di(para-tertbutylphenethyl)tetramethyldisilazane;

among N-silylacetamides; N-trimethylsilylacetamide, N-methyldiphenylsilylacetamide or N-triethylsilylacetamide;

among alkoxysilanes: tert-butyldiphenylmethoxysilane, octadecyldimethylmethoxysilane, dimethyloctylmethoxysilane, octylmethyldimethoxysilane, octyltrimethoxysilane, trimethylethoxysilane or octyltriethoxysilane.

The hydroxyl functional groups of the microfibrils can also be etherified by halogenated alkylating agents of formula $R_4$—X, in which X is a halogen atom chosen from chlorine, bromine and iodine, and $R_4$ is a hydrocarbonaceous radical corresponding to the same definition as R, $R_1$, $R_2$ and $R_3$.

Mention may more particularly be made, among halogenated alkylating agents, of:

chloropropane or chlorobutane;

bromopropane, bromohexane or bromoheptane, and iodomethane, iodoethane, iodooctane, iodooctadecane or iodobenzene.

The etherification agent can, in addition, be an isocyanate of formula $R_5$—NCO, in which $R_5$ is a hydrocarbonaceous radical corresponding to the same definition as R, $R_1$, $R_2$ and $R_3$.

The isocyanate is advantageously chosen from butyl isocyanate, tert-butyl isocyanate, pentyl isocyanate, octyl isocyanate, dodecyl isocyanate, octadecyl isocyanate or phenyl isocyanate.

Alkylene oxides can also be used as etherification agent. In the alkylene oxides of formula:

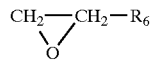

$R_6$ can represent a hydrocarbonaceous radical corresponding to the same definition as R, $R_1$, $R_2$ and $R_3$.

Mention may be made, by way of examples, of 1,2-epoxybutane, 1,2-epoxyhexane, 1,2-epoxyoctane, 1,2-epoxydecane, 1,2-epoxydodecane, 1,2-epoxyhexadecane, 1,2-epoxyoctadecane or 1,2-epoxy-7-octene.

The etherification agent can also be a glycidyl compound of formula:

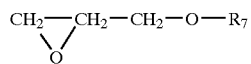

in which $R_7$ can represent a hydrocarbonaceous radical corresponding to the same definition as R, $R_1$, $R_2$ and $R_3$.

More particularly, the glycidyl compound can be chosen from methyl glycidyl ether, propyl glycidyl ether, butyl glycidyl ether, 2-methylbutyl glycidyl ether, ethylhexyl glycidyl ether, octyl glycidyl ether, lauryl glycidyl ether, allyl glycidyl ether or benzyl glycidyl ether.

The hydroxyl functional groups of the microfibrils can be etherified with a single type of etherification agent among those mentioned above or with etherification agents of different natures.

In the case of an etherification by agents of different natures, the etherification can take place either in one or in several successive reaction(s), which would result in the production of microfibrils comprising different organic residues at the surface.

One of the essential characteristics of the surface-modified microfibrils is their degree of surface substitution (DSS).

The degree of surface substitution (DSS) is generally defined as the number of surface hydroxyl functional groups substituted per glucose unit. It is obtained from the overall mean degree of substitution DS from the general formula:

$$(DSS) = (DS)/(Cs/Ct)$$

in which Cs represents the surface chains and Ct represents the total chains.

The overall mean DS is obtained by the determination of the concentration by weight of all or part of the group grafted by the etherification reaction and by applying the following general formula:

$$DS = (162 \times Y)/[(g \times 100) - (G \times Y)]$$

in which

Y represents the percentage by weight with respect to the total weight of the grafted product of the part analysed (which can thus be the % w/w of a heteroatom, measured by elemental analysis, or alternatively the % w/w of a group, measured by a chromatographic technique), g represents the molecular weight of the part analysed (in the case of a heteroatom, it will be the atomic weight of this heteroatom; in the case of a given group, it will be the molecular weight of the group), G represents the total molecular weight of the group grafted by etherification.

The degrees of surface substitution (DSS) calculated below make possible a better understanding of this method of determination.

Calculation of the (DSS) for silylating agents:

In the case where the surface hydroxyl groups of the microfibrils are modified by a silylating agent, for example a haloalkylsilane, in particular chlorodimethylisopropylsilane, the substitution of n hydrogens by n alkylsilane groups, in particular dimethylisopropylsilyl, results in the following empirical formula of the final compound:

$$C_{(6+5n)}H_{(10+12n)}Si_nO_5$$

with a molar mass M=162+100n; 162 being the molar mass of a hexose unit. The percentage of silicon will thus be:

$$\% \ Si = y = \frac{28n}{162 + 100n} \times 100$$

from which it is possible to obtain the overall degree of substitution (DS), which will then be:

$$DS = \frac{162y}{2800 - 100y}$$

The degree of surface substitution (DSS) is subsequently obtained from the ratio of the Cs (number of surface chains) to the Ct (total number of chains):

$$(DSS) = (DS)/(Cs/Ct)$$

as the ratio Cs/Ct is 0.77 in the case of beet microfibrils, the (DSS) will then be equal to:

$$(DSS) = (DS)/0.77$$

Calculation of the (DSS) for isocyanate reactants:

In the case of the modification of the surface hydroxyl groups of the cellulose microfibrils by an isocyanate reactant as defined above, the substitution of n hydrogens by n alkylurethane groups, for example octylurethane, the empirical formula of the final compound will be as follows:

$$C_{(6+9n)}H_{(10+17n)}N_nO_{(5+n)}$$

corresponding to a molar mass M=162+155n; 162 being the molar mass of a hexose unit.

The percentage of nitrogen will thus be:

$$\% \ N = y = \frac{14n}{162 + 155n} \times 100$$

from which it is possible to obtain the overall degree of substitution (DS):

$$DS = \frac{162y}{1400 - 155y}$$

The degree of surface substitution (DSS) is subsequently obtained from the ratio of the Cs (number of surface chains) to the Ct (total number of chains), which is 0.77 in the case of beet microfibrils:

$$(DSS) = (DS)/0.77$$

Calculation of the (DSS) for halogenated alkylating agents, alkylene oxides or glycidyl compounds: The substitution of n hydrogens of the surface hydroxyl groups of the cellulose microfibrils by n alkyl groups originating from a haloalkyl, such as butyl originating, for example, from chlorobutane, results in an empirical formula of the final compound which will be:

$$C_{(6+4n)}H_{(10+8n)}O_5$$

corresponding to a molar mass M=162+56n; 162 being the molar mass of a hexose unit.

If y % by weight of butyl ($C_4H_9$) unit is quantitatively determined with respect to the starting material, the overall DS will be obtained with the following formula:

$$DS = \frac{162y}{56} \times \frac{1}{100 - y}$$

To obtain the (DSS), it is necessary, as above, to use the formula:

$$(DSS) = (DS)/(Cs/Ct)$$

When the etherification agent is a silylating agent or an isocyanate, the degree of surface substitution can be determined by conventional elemental analysis.

In the case where the etherification is carried out by halogenated alkylating agents, alkylene oxides or glycidyl compounds, the (DSS) can be determined by quantitative determination of the alkyl groups, advantageously according to the Zeisel method described in Analytical Chemistry No. 13, p. 2172, 1979. This method consists in decomposing the ether bond at 140° C. in the presence of hydrogen iodide (HI) and in quantitatively determining the corresponding iodides by gas chromatography.

The alkyl groups can also be determined by $^{13}C$ nuclear magnetic resonance according to the method described by Y.

Tezuka: Determination of substituent distribution in cellulose ether by mean of $^{13}$C NMR study on their acetylated derivatives, Makromol. Chem., 191, p. 681, 1990.

The degree of surface substitution (DSS) is at least 0.05, advantageously between 0.1 and 1 and more particularly between 0.2 and 0.7.

Another subject-matter of the invention is a process for the manufacture of cellulose microfibrils with a modified surface, such as have been described above, from cellulose microfibrils obtained by fibrillation of a material comprising cellulose fibres, characterized in that it consists in:
  i—wetting and/or dispersing the cellulose microfibrils in a liquid medium which does not destroy the cellulose microfibril,
  ii—adding, to the dispersion, an agent for the etherification or a mixture of agents for the etherification of the hydroxyl functional groups of the cellulose and optionally a catalyst and/or an activator of the etherification reaction,
  iii—halting the etherification reaction after the desired degree of surface substitution (DSS) has been obtained,
  iv—separating the microfibrils thus obtained from the reaction medium.

The term "medium which does not destroy the cellulose microfibril" is understood to mean a medium in which the microfibril retains its native crystalline nature.

Thus, the microfibrils are first dispersed in a liquid medium—stage (i).

This liquid should advantageously not dissolve the cellulose nor have a negative effect on the structure of the cellulose microfibrils.

Mention may be made, as suitable liquids, of aliphatic and/or cyclic ethers, in particular ethyl ether and tetrahydrofuran; optionally halogenated aliphatic hydrocarbons, in particular hexane, xylene or perchloroethylene; optionally halogenated aromatic hydrocarbons, in particular toluene or pyridine; alcohols, in particular isopropanol or butanol; and water; it being possible for these liquids to be alone or as a mixture.

After dispersion of the microfibrils, in stage (ii), an etherification agent or mixture of etherification agents is added to the medium, advantageously with an etherification catalyst and/or activator.

The etherification agents are chosen from those described above.

The etherification catalysts can be chosen from the group comprising, for example, imidazole, pyridine, triethylamine, tetrabutylammonium fluoride hydrate, trimethylsilyl chloride, sodium hydroxide, potassium hydroxide or tin derivatives, such as, for example, tin octanoate or tin dilaurate.

Mention may be made, as activating agent for the reaction for the etherification of the cellulose microfibrils, by way of examples, of sodium hydroxide, potassium hydroxide or pyridine.

According to the choice of the etherifying organic compound(s), a person skilled in the art will know how to choose the catalyst and/or the activator which is/are the best suited and their concentration(s), both with respect to the dispersing liquid medium and with respect to the microfibrils.

The nature and the concentration of the catalyst and/or of the activator will be chosen so as to avoid destroying the microfibril.

According to a specific embodiment, stages (i) and (ii) can optionally be concomitant.

The etherification reaction is advantageously carried out with stirring and optionally in an inert atmosphere.

The etherification reaction is carried out at the appropriate temperature for a period of time determined according to the degree of surface substitution (DSS) desired. The temperature will be chosen while taking into account the nature of the therification agent and its reactivity.

The halting of the etherification—stage (iii)—is achieved, for example, either by addition of a compound, advantageously water, which renders the etherification agent inactive or by cooling and/or diluting the medium or by exhaustion of the etherification agent or agents.

The partially etherified microfibrils are then extracted from the medium—stage (iv)—by any appropriate means, in particular by lyophilization, centrifugation, filtration or precipitation.

The microfibrils are then advantageously washed and dried.

When it is desired to manufacture microfibrils which are modified at the surface by different organic residues, either the operations described above are repeated while adding, in stage (ii), a different etherification agent on each occasion or the dispersion of microfibrils is treated in stage (ii) with a mixture of etherification agents.

This principle also applies when stages (i) and (ii) are concomitant.

The surface modification of the microfibrils thus makes it possible to obtain a very good dispersibility and compatibility with organic media, whether they are fluid, highly viscous or solid.

Another subject-matter of the invention relates to the use of the surface-modified microfibrils in accordance with the invention as viscosifying and/or texturizing agents for fluid media and/or as texturizing agent and/or reinforcing filler for highly viscous or solid media.

They can be employed in the pulverulent form or in the form of an organic dispersion.

A further subject-matter of the present invention is compositions comprising cellulose microfibrils with a modified surface such as have been described above or such as have been obtained according to the abovementioned process.

The microfibrils of the invention can exercise their role of viscosifying agents in cosmetic formulations, drilling fluids, paints, glazes, adhesives or inks and as reinforcing filler in polymers, in particular in thermoplastics, thermosetting materials, crosslinked or noncrosslinked elastomers, and mastics.

Another subject-matter of the present invention is compositions comprising microfibrils with a modified surface such as have been described above or such as have been obtained according to the abovementioned process.

It is possible to add to these compositions, in addition to the microfibrils, the usual additives necessary for their use according to the field of application, such as, for example, vulcanization ingredients in the specific case of elastomers, coupling agents, plasticizers, stabilizers, lubricants, pigments, and the like.

These compositions can be employed, for example, as floor coverings, engine mounts, components of vehicle tracks, shoe soles, cableway wheels, seals for domestic electrical appliances, cable sheaths or transmission belts.

Finally, the compositions according to the invention can find applications as battery separator.

Thus, the present invention makes it possible to obtain compositions based on an elastomer or an alloy or blend of elastomers, the elastomer preferably being vulcanized, which can be used in any part of the tyre.

In this specific case, it should be noted that the content of association according to the invention is such that the content of microfibrils in the concerned part of the tyre can range up to 80% by weight, more particularly can be between 0.1 and 50% by weight, with respect to the total weight of the composition.

In the other applications, lower contents of microfibrils may be desired. It is possible, for example, to envisage compositions comprising at most 10% by weight, advantageously at most 5% by weight and preferably at most 2% by weight with respect to the total weight of the composition.

The following examples illustrate the invention without, however, limiting the scope thereof.

EXAMPLES

Example 1

Etherification of the Microfibrils by Chlorodimethylisopropylsilane

Approximately 10 g of an aqueous suspension of parenchyma cellulose microfibrils (with a concentration equal to 2.3% as weight/weight) are placed in a centrifuge tube with a capacity of 100 cc, to which approximately 80 cc of acetone are subsequently added.

The mixture is then centrifuged for 30 minutes at 3 700 rev/min. The pellet obtained is resuspended in acetone and then centrifuged to remove the solvent. The latter operation is repeated: 3 times with acetone, once with an acetone/methanol (50/50 v/v) mixture, twice with toluene and a final time with anhydrous toluene. The final pellet is recovered and suspended in 10 ml of anhydrous toluene.

Following this operation, on the one hand, the solids content is determined by drying and weighing and, on the other hand, the residual water content is determined by Karl Fischer quantitative determination (device equipped with a Büchi oven heated to 150° C. for 1 hour while flushing with nitrogen).

In this example, the amount of cellulose is 0.158 g ($0.975 \times 10^{-3}$ mol) of anhydroglucose equivalent and the water content is 0.0181 g ($1.0 \times 10^{-3}$ mol).

The suspension is then placed in a reactor and the desired amount of reactant is added so as to have 2 mol of silane per 1 surface anhydroglucose group.

0.40 ml of chlorodimethylisopropylsilane, with a molecular weight of 136.7 and a relative density of 0.869, and 0.174 g of imidazole ($2.55 \times 10^{-3}$ mol) are thus added.

The mixture is then stirred in the closed reactor at ambient temperature for 16 hours.

Subsequently, 70 ml of a THF/methanol (80/20 v/v) mixture are added to dissolve the salt formed by the reaction between the imidazole and the hydrochloric acid given off during the reaction and to destroy the residual chlorosilane.

The combined mixture is then centrifuged and the pellet is washed twice with THF and isolated by centrifugation. Quantitative Determination of Silicon—Determination of the (DSS)

In order to be able to determine the (DSS) of the microfibrils, the silicon has to be quantitatively determined. To do this, a fraction of the product is treated, prior to this quantitative determination, in a Soxhlet for 48 hours in THF to completely remove the dimers formed. The sample is subsequently decomposed by combustion in a Schoniger flask, then displaced with an N/10 aqueous NaOH solution and quantitatively determined by ICP/AES.

The analysis of the silicon content gives a value of 4.1%, which results in a DSS of 0.36.

Observation under a microscope indicates that the microfibrils thus "etherified" still exist in the form of fibres. The latter flocculate in an aqueous medium but are dispersible in THF.

Example 2

Rheological Behaviour

The rheological behaviour of the suspensions in THF of the microfibrils obtained in Example 1 was studied.

Measurements are carried out on suspensions with a concentration of 0.1% weight/weight.

The viscosity ( ) is measured on an RFS 8400 rheometer in Couette geometry (scanning at a shear rate between 0.1 and 100 s$^{-1}$).

It is expressed in mPa s, it being known that that of the THF is 1 mPa·s.

The results are summarized in Table I.

TABLE I

| at 0.1 sec$^{-1}$ | at 1 sec$^{-1}$ | at 10 sec$^{-1}$ | at 63.9 sec$^{-1}$ |
| --- | --- | --- | --- |
| 475 | 90 | 19 | 7.1 |

It is found that the suspensions of microfibrils of Example 1 in THF exhibit high viscosities and a behaviour of pseudo-plastic type (decrease in viscosity when the shear rate increases). This type of behaviour is comparable with that of the non-surface-modified microfibrils in water.

Example 3

Etherification of the Microfibrils by Chlorodimethylisopropylsilane

Approximately 5 liters of acetone are added to one litre of aqueous suspension of parenchyma cellulose microfibrils (with a concentration equal to 2.3%). This mixture, which results in the flocculation of the cellulose microfibrils, is subsequently filtered so as to remove the most solvent. The operation is repeated: 3 times with acetone, once with an acetone/toluene (50/50 v/v) mixture, twice with toluene and one final time with anhydrous toluene. The medium is homogenized after each exchange.

The final cake is subsequently recovered and suspended in 1.5 liters of anhydrous toluene.

The amount of solids is 19.5 g (0.120 mol) and the amount of residual water is 0.195 g (0.0108 mol).

The suspension is then placed in a reactor and the desired amount of reactants is added so as to have 1.74 mol of silane per 1 surface anhydroglucose group.

27 ml of chlorodimethylisopropylsilane (0.172 mol) and 16 g of imidazole are thus added.

The mixture is then stirred in the closed reactor at ambient temperature for 16 hours.

After reaction, 2 liters of methanol are introduced to dissolve the salt formed by the reaction between the imidazole and the hydrochloric acid given off during the reaction and to destroy the residual chlorosilane.

The solvent is removed by filtration and the filtration cake is washed twice in succession with 2 liters of acetone to remove the silyl ether formed.

The cake is placed in water, the residual acetone is removed on a rotary evaporator and lyophilization is carried out.

The analysis of the silicon content gives a value of 9%, which results in a DSS of 1.

Observation under a microscope shows that the product still exists in the form of microfibrils.

The microfibrils thus modified form dispersions at ambient temperature for a concentration of 0.05% w/w, obtained directly by mixing between the powder and the liquid and then treated for 2 minutes in an ultrasonic bath, which dispersions do not flocculate in the following solvents:

toluene diethyl ether methyl, ethyl, propyl, isobutyl, butyl and pentyl acetate chloroform, dichloromethane tetrahydrofuran 1-butanol, 1-hexanol, 1-octanol butyraldehyde and isophorone rapeseed oil and isopropyl myristate silicone oil 48 V 750

Example 4

Etherification of the Microfibrils by Chlorodimethylbutylsilane

In this example, the procedure of Example 1 is repeated, in which procedure the silylating agent is replaced by chlorodimethylbutylsilane.

The molecular weight of chlorodimethylbutylsilane is 150.7 and its relative density is 0.875.

The amount of cellulose in this example is 0.115 g ($0.709 \times 10^{-3}$ mol) of anhydroglucose (AHGU) equivalent and the water content is 0.0096 g ($0.533 \times 10^{-3}$ mol).

The amount of chlorodimethylbutylsilane is 0.18 ml and that of imidazole is 0.074 g ($1.08 \times 10^{-3}$ mol).

When the suspension of cellulose in anhydrous toluene is placed in the reactor, the desired amount of silylating agent is added so as to have 1 mol of silane per 1 surface anhydroglucose group.

The analysis of the silicon contents gives a value of 1.9%, which results in a DSS of 0.155.

Observation under a microscope shows that the microfibrils thus "etherified" still exist in the form of fibrils.

The latter flocculate in an aqueous medium but are dispersible in THF.

Example 5

Etherification of the Microfibrils by Chlorodimethyloctylsilane

In this example, the procedure of Example 1 is repeated, in which procedure the silylating agent is replaced by chlorodimethyloctylsilane.

The molecular weight of chlorodimethyloctylsilane is 206.8 and its relative density is 0.873.

The amount of cellulose in this example is 0.213 g ($1.315 \times 10^{-3}$ mol) of anhydroglucose (AHGU) equivalent and the water content is 0.017 g ($0.944 \times 10^{-3}$ mol).

The amount of chlorodimethyloctylsilane is 0.70 ml and that of imidazole is 0.202 mg ($3 \times 10^{-3}$ mol).

When the suspension of cellulose in anhydrous toluene is placed in the reactor, the desired amount of silylating agent is added so as to have 2 mol of silane per 1 surface anhydroglucose group.

The analysis of the silicon content gives a value of 5.2%, which results in a DSS of 0.57.

Observation under a microscope shows that the microfibrils thus "etherified" still exist in the form of fibres.

The latter flocculate in an aqueous medium but are dispersible in THF.

Example 6

Etherification of the Microfibrils by Chlorodimethyldodecylsilane

In this example, the procedure of Example 1 is repeated, in which procedure the silylating agent is replaced by chlorodimethyldodecylsilane.

The molecular weight of chlorodimethyldodecylsilane is 262.9 and its relative density is 0.865.

The amount of cellulose in this example is 0.177 g ($1.092 \times 10^{-3}$ mol) of anhydroglucose (AHGU) equivalent and the water content is 0.02 g ($1.111 \times 10^{-3}$ mol).

The amount of chlorodimethyldodecylsilane is 0.85 ml and that of imidazole is 0.190 mg ($2.8 \times 10^{-3}$ mol).

When the suspension of cellulose in anhydrous toluene is placed in the reactor, the desired amount of silylating agent is added so as to have 2 mol of silane per 1 surface anhydroglucose group.

The analysis of the silicon content gives a value of 4.2%, which results in a DSS of 0.48.

Observation under a microscope shows that the microfibrils thus "etherified" still exist in the form of fibres.

The latter flocculate in an aqueous medium but are dispersible in THF.

Example 7

Etherification of the Microfibrils by Octyl Isocyanate

In this example, the surface of the microfibrils is modified by reaction of the surface hydroxyl groups with octyl isocyanate.

The first part, corresponding to the exchange of solvent between the water and the toluene, is identical to that in Example 1.

The suspension of microfibrils in anhydrous toluene comprises 0.167 g of cellulose ($1.03 \times 10^{-3}$ mol).

It is then placed in a reactor and 1.2 ml of octyl isocyanate, with a molecular weight of 155.2 and a relative density of 0.88, are added.

The mixture is then stirred in the closed reactor at 80° C. for 16 hours.

After cooling, 70 ml of methanol are added. The combined mixture is then centrifuged and the pellet is washed twice with THF and then with hexane.

The analysis of the nitrogen content gives a value of 1.38%, which results in a DSS of 0.25.

Observation under a microscope shows that the product still exists in the form of fibres.

The latter are dispersible in THF.

Example 8

Use in a Crosslinked (Vulcanized) Elastomer

The object of this example is to evaluate the properties of the vulcanized elastomer comprising the modified microfibrils resulting from Example 3 (composition B), compared with those of an elastomer not comprising modified microfibrils (composition A).

The following two elastomer compositions are prepared:

|  | A (reference) | B (invention) |
|---|---|---|
| SBR (*) | 90.1 | 73.5 |
| Modified microfibrils | — | 18.4 |
| Antioxidant (**) | 1.3 | 1.06 |
| Stearic acid | 2.25 | 1.84 |
| Zinc oxide | 2.25 | 1.84 |
| Diphenylguanidine | 1.35 | 1.10 |
| Sulphenamide (***) | 1.8 | 1.47 |
| Sulphur | 0.9 | 0.73 |

The amounts are expressed as per cent by weight with respect to the total weight of the composition.
(*) Styrene-butadiene copolymer synthesized in solution (SBR Buna VSL 5525-1/Bayer) comprising 27.3% of oil.
(**) Antioxidant: N-(1,3-dimethylbutyl)-N'-phenyl-p-phenylenediamine.
(***) Sulphenamide: N-cyclohexyl-2-benzothiazole-sulphenamide.

Each composition is prepared by applying thermomechanical work in a Brabender internal mixer with a capacity of 70 cm³, in one stage, for a mean blade speed of 50 revolutions per minute, until a temperature of 100° C. is achieved at the end of the stage, followed by a stage of acceleration and of finishing on an external mixer. The vulcanization of the compositions is adjusted to the kinetics of vulcanization of each blend.

The physical properties of the blends are recorded in Table II below.

TABLE II

| Properties | A (reference) | B (invention) |
|---|---|---|
| 10% Modulus (MPa) | 0.13 | 0.2 |
| 100% Modulus (MPa) | 0.45 | 0.7 |
| 300% Modulus (MPa) | 0.92 | 1.24 |
| Elongation | 356% | 474% |
| Tensile strength (MPa) | 1.2 | 2.1 |
| Shore A 15 s | 22 | 31 |

The measurements are carried out according to the following methods:
  tension: the moduli are measured on the vulcanizates according to Standard NF T46002. It should be noted that the 10%, 100% or 300% modulus in the rubber trades refers to the stress measured at a tensile elongation of 10%, 100% or 300% respectively.
  Shore A 15 s hardness: the Shore A 15 s hardness is measured according to Standard ASTM D2240; the value under consideration is determined 15 seconds after the application of the force.

From Table II, it is found that the composition comprising the surface-modified microfibrils (composition B) results in mechanical stresses and in hardnesses which are markedly higher in comparison with the reference composition (composition A).

It is noteworthy to observe that the increase in modulus of the composition comprising the microfibrils of the invention takes place without harming the tensile strength and the elongation at break of the vulcanized composition. On the contrary, in the presence of the microfibrils, a significant increase in the elongation at break is observed.

This example clearly shows that the microfibrils with a modified surface were homogeneously dispersed in the elastomer. For this reason, they result in a significant improvement in terms of mechanical properties in comparison with the reference.

What is claimed is:

1. Cellulose microfibrils with a modified surface, having hydroxyl functional groups present at the surface etherified by at least one organic compound comprising at least one functional group which reacts with said hydroxyl functional groups and with a degree of surface substitution (DSS) of at least 0.05, said organic compound being a silylating agent, isocyanate, halogenated alkylating agent, alkylene oxide, or glycidyl compound.

2. Microfibrils according to claim 1, wherein the silylating agent is: a haloalkylsilane of formula: $R_3R_2R_1Si$—X, $R_2R_1Si(X)_2$ or $R_1Si(X)_3$;
a disilane of formula: $R_3R_2R_1N$—Si—$NR_1R_2R_3$;
a N-silylacetamide of formula:

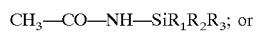

$CH_3$—CO—NH—$SiR_1R_2R_3$; or a alkoxysilane of formula: $R_3R_2R_1Si$—OR or $R_2R_1Si(OR)(OR_3)$;
wherein:
—R, $R_1$, $R_2$ and $R_3$, which are identical or different, are optionally substituted, saturated or unsaturated, linear, branched or cyclic hydrocarbonaceous radicals having 1 to 30 carbon atoms, and
—X is chlorine, bromine or iodine.

3. Microfibrils according to claim 2, whern the R, $R_1$, $R_2$ and $R_3$ radicals are methyl, ethyl, propyl, isopropyl butyl, sec-butyl tert-butyl, pentenyl, hexyl cyclohexyl octyl, nonyl, decyl dodecyl, undecyl, nonadecyl, eicosyl ($C_{20}$), docosyl ($C_{22}$), octacosyl ($C_{28}$), triacontanyl ($C_{30}$), vinyl, allyl, phenyl, styryl or naphthyl.

4. Microfibrils according to claim 3, wherein the silylating is chlorodimethylisopropylsilane, chlorodimethylbutylsilane, chlorodimethyloctylsilane, chlorodimethyldodeyilane, chlorodimethyloctadecylsilane, chlordimethylphenylsilane, chloro-(1-hexenyl) dimethylsilane, dichlorohexylmethylsilane, dichloroheptylmethylsilane, trichlorooctylsilane; hexamethyldisilazane, 1,3-divinyl-1,1,3,3-tetramethyldisilazane, 1,3-divinyl-1,3-diphenyl-1,3-dimethyldisilazane, 1,3-N-dioctyltetramethyldisilazane, diisobutyltetramethyldisilazane, diethyltetramethyldisilazane, N-dipropyltetramethyldisilazane, N-dibutyltetramethyldisilazane, 1,3-di(para-tertbutylphenethyl)tetramethyldisilazane; N-trimethylsilylacetamide, N-methyldiphenylsilylacetamide, N-triethylsilylacetamide; tert-butyldiphenylmethoxysilane, octadecyldimethylmethoxysilane, dimethyloctylmethoxysilane, octylmethyldimethoxysilane, octyltrimethoxysilane, trimethylethoxysilane, or octyltriethoxysilane.

5. Microfibrils according to claim 1, wherein the halogenated alkylating agent is of formula $R_4$—X, wherein: X is chlorine, bromine or iodine and $R_4$ is an optionally substituted, saturated or unsaturated, linear, branched or cyclic hydrocarbonaceous radicals having 1 to 30 carbon atoms.

6. Microfibrils according to claim 5, wherein the halogenated alkylating agent is chloropropane, chlorobutane, bromopropane, bromohexane, bromoheptane, iodomethane, iodoethane, iodooctane, iodooctae or iodobenzene.

7. Microfibrils according to claim 1, wherein the isocyanate is of formula $R_5$—NCO, wherein: $R_5$ is an optionally substituted, saturated or unsaturated, linear, branched or cyclic hydrocarbone radicals having 1 to 30 carbon atoms.

8. Microfibrils accoding to claim 7, wherein the isocyanate is butyl isocyanate, tert-butyl isocyanate, pentyl isocyanate, octyl isocyanate, dodecyl isocyanate, octadecyl isocyanate or phenyl isocyanate.

9. Microfibrils according to claim 1, wherein the alkylene oxide is of formula:

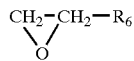

wherein: $R_6$ represents an optionally substituted, saturated or unsaturated, linear, branched or cyclic hydrocarbonaceous radicals having 1 to 30 carbon atoms.

10. Microfibrils according claim 9, wherein the alkylene oxide is 1,2-epoxybutane, 1,2-epoxyhexane, 1,2-epoxyoctane, 1,2-epoxydecane, 1,2-epoxydodecane, 1,2-epoxyhexadecane, 1,2-epoxyoctadecane or 1,2-epoxy-7-octene.

11. Microfibrils according to claim 1, wherein the glycidyl compound is of formula:

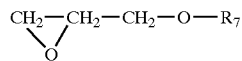

wherein: $R_7$ represents an optionally substituted, satuared or unsaturated, linear, branched or cyclic hydrocarbonaceous radicals having 1 to 30 carbon atoms.

12. Microfibrils according to claim 11, wherein the glycidyl compound is metyl glycidyl ether, propyl glycidyl ether, butyl glycidyl ether, 2-methylbutyl glycidyl ether, ethylhexyl glycidyl ether, octyl glycidyl ether, lauryl glycidyl ether, allyl glycidyl ether or benzyl glycidyl ether.

13. A process for the manufacture of cellulose microfibrils with a modified surface as defined in claim 1 from cellulose microfibrils obtained by fibrillation of a material comprising cellulose fibers, said process comprising the steps of:

i—wetting or dispersing the cellulose microfibrils in a liquid dispersion medium which does not destroy the cellulose microfibrils, ii—adding, to the dispersion, an agent for the etherification or a mixture of agents for the etherification of the hydroxyl functional groups of the cellulose and optionally a catalyst or an etherification activator and carrying out an etherification reaction, said agent being a sylilating agent, isocyanate, halogenated alkylating agent, alkylene oxide, or glycidyl compound, iii—halting the etherification reaction after the desired degree of surface substitution (DSS) has been obtained, and iv—separating the microfibrils obtained in step iii from the liquid medium.

14. A process for viscosifying or texturizing a fluid medium or a reinforcing filler comprising the step of adding to said fluid or filler a viscosifying or texturizing amount of microfibrils as defined in claim 1.

15. A cosmetic formulation, drilling fluid, paint, glaze, adhesive or ink, comprising a viscosifying amount of microfibrils as defined in claim 1.

16. A thermoplastic material thermosetting material, crosslinked elastomer, noncrosslinked elasomer, or mastic comprising a reinforcing amount of microfibrils as defined in claim 1.

17. Mirofibrils according to claim 1, wherein the degree of surface substitution (DSS) is between 0.1 and 1.

18. Microfibrils according to claim 17, wherein the degree of surface substitution (DSS) is between 0.2 and 0.7.

* * * * *